US010464073B2

(12) United States Patent
Yuan et al.

(10) Patent No.: US 10,464,073 B2
(45) Date of Patent: Nov. 5, 2019

(54) DRY-WET COMBINED SORTING SYSTEM FOR MUNICIPAL SOLID WASTE

(71) Applicant: GUANGZHOU INSTITUTE OF ENERGY CONVERSION, CHINESE ACADEMY OF SCIENCES, Guangzhou, Guangdong (CN)

(72) Inventors: Haoran Yuan, Guangzhou (CN); Yazhuo Wang, Guangzhou (CN); Tao Lu, Guangzhou (CN); Yong Chen, Guangzhou (CN); Chiguang Zhang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 848 days.

(21) Appl. No.: 15/035,946

(22) PCT Filed: Jan. 21, 2014

(86) PCT No.: PCT/CN2014/070965
§ 371 (c)(1),
(2) Date: May 11, 2016

(87) PCT Pub. No.: WO2015/070535
PCT Pub. Date: May 21, 2015

(65) Prior Publication Data
US 2016/0288136 A1    Oct. 6, 2016

(30) Foreign Application Priority Data

Nov. 14, 2013    (CN) .......................... 2013 1 0567510

(51) Int. Cl.
*B03B 9/06*    (2006.01)
*B03B 5/36*    (2006.01)
(Continued)

(52) U.S. Cl.
CPC .............. *B03B 9/06* (2013.01); *B02C 18/142* (2013.01); *B02C 23/10* (2013.01); *B02C 23/14* (2013.01);
(Continued)

(58) Field of Classification Search
CPC ......... B02C 23/10; B02C 23/14; B02C 23/20; B02C 18/142; B09B 5/00; B09B 3/00; B03B 9/06; Y02W 30/521–525
(Continued)

(56) References Cited

U.S. PATENT DOCUMENTS 3,814,336 A * 6/1974 Brewer .................... B03B 5/52
                                                 241/79.1
4,065,282 A   12/1977 Morey
(Continued)

FOREIGN PATENT DOCUMENTS

CA    2 847 986 A1    3/2013
CN      1241622 A     1/2000
(Continued)

OTHER PUBLICATIONS

International Search Report dated Aug. 29, 2014, issued in counterpart International Application No. PCT/CN2014/070965 (3 pages).

*Primary Examiner* — Shelley M Self
*Assistant Examiner* — Smith Oberto Bapthelus
(74) *Attorney, Agent, or Firm* — Westerman, Hattori, Daniels & Adrian, LLP

(57) ABSTRACT

A dry-wet combined sorting system for municipal solid waste comprising a dry type smashing and winnowing device and a wet type water sorting device. The system is compact in structure; smashing knives with different revolving speeds and the same revolving direction are provided, thereby enabling continuous processing of the system which is high in processing efficiency and simple in operation;

(Continued)

meanwhile, multiple protection devices are provided, so that the whole system is safe and reliable; perishable organic matters, light combustible matters and inorganic matters can be separated completely; the light combustible matters are picked out by the dry type smashing and winnowing device, which ensures their low water content and facilitates their subsequent energy-oriented utilization. Therefore, the municipal solid waste is into valuable thing for it can be utilized sufficiently as a resource, and the system has very high environmental benefits and social benefits.

14 Claims, 3 Drawing Sheets

(51) Int. Cl.
    *B02C 23/10*     (2006.01)
    *B02C 23/14*     (2006.01)
    *B02C 23/20*     (2006.01)
    *B02C 23/36*     (2006.01)
    *B02C 23/38*     (2006.01)
    *B09B 3/00*     (2006.01)
    *B09B 5/00*     (2006.01)
    *B02C 18/14*     (2006.01)

(52) U.S. Cl.
    CPC .............. *B02C 23/20* (2013.01); *B02C 23/36* (2013.01); *B02C 23/38* (2013.01); *B03B 5/36* (2013.01); *B09B 3/00* (2013.01); *B09B 5/00* (2013.01); *Y02W 30/521* (2015.05); *Y02W 30/523* (2015.05); *Y02W 30/524* (2015.05); *Y02W 30/525* (2015.05)

(58) Field of Classification Search
    USPC .......................................................... 241/41
    See application file for complete search history.

(56) References Cited

U.S. PATENT DOCUMENTS

| | | | |
|---|---|---|---|
| 4,264,352 A | | 4/1981 | Houser |
| 10,272,441 B2 * | | 4/2019 | Yuan .......................... B07B 4/02 |
| 2008/0121574 A1 * | | 5/2008 | Sanchez Torres ........ B03B 5/40 |
| | | | 209/699 |
| 2013/0171725 A1 * | | 7/2013 | Koh, II ..................... B09B 3/00 |
| | | | 435/290.4 |
| 2014/0291259 A1 * | | 10/2014 | Gravett ..................... B03B 9/06 |
| | | | 210/770 |
| 2016/0250648 A1 * | | 9/2016 | Yuan .......................... B07B 4/02 |
| | | | 241/76 |
| 2016/0288136 A1 * | | 10/2016 | Yuan ....................... B02C 23/20 |

FOREIGN PATENT DOCUMENTS

| | | | |
|---|---|---|---|
| CN | 1280887 A | | 1/2001 |
| CN | 2845930 Y | | 12/2006 |
| CN | 201036775 Y | | 3/2008 |
| CN | 101590443 A | | 12/2009 |
| CN | 101590444 A | | 12/2009 |
| CN | 102225416 A | | 10/2011 |
| CN | 202876942 U | | 4/2013 |
| CN | 202910058 U | * | 5/2013 |
| CN | 202910058 U | | 5/2013 |
| CN | 203061442 U | * | 7/2013 |
| CN | 203061442 U | | 7/2013 |
| EP | 0 722 778 A1 | | 7/1996 |
| WO | 2012/071112 A1 | | 5/2012 |

* cited by examiner

DRY-WET COMBINED SORTING SYSTEM FOR MUNICIPAL SOLID WASTE

FIELD OF THE INVENTION

The present invention relates to a municipal solid waste sorting system, and specifically relates to a dry-wet combined sorting system for municipal solid waste.

BACKGROUND OF THE INVENTION

According to statistics, the delivering quantity of municipal solid waste in China is about 164 million tons in 2012, and annually increases by 8-10% in recent years. Thus the treatment of the national municipal solid waste has become one of the important factors that influence urban sustainable development. At present, the municipal solid waste is mainly treated in three ways: sanitary landfill, composting and incineration. Incineration can greatly reduce the volume and the weight of the waste and produce clean electrical energy, and therefore has become a popular way for treating waste. However, municipal waste varies in component and size, particularly includes a large amount of kitchen waste, and is mostly collected in plastic bags, resulting in that the water content of the MSW is mostly more than 50%; in addition, the municipal waste contains non-combustible inorganic matters such as sand gains and glass; and due to the above problems, burning municipal waste is difficult and low in efficiency, and more importantly, is one of the inducements for the formation of dioxin.

SUMMARY OF THE INVENTION

The object of the present invention is to provide a dry-wet combined sorting system for municipal solid waste, which separates municipal solid waste into perishable organic matters, light combustible matters and inorganic matters, and treat each kind of matters in their relevant way. Thus, the system can turn the municipal solid waste into resource that can be fully taken advantage of and has very high environmental benefits and social benefits.

The present invention is implemented by the following technical solution:

A dry-wet combined sorting system for municipal solid waste includes a dry type smashing and winnowing device and a Wet type water sorting device, wherein the dry type smashing and winnowing device includes a feeding port at the top thereof, a smashing bin below the feeding port, a sieve below the smashing bin, a winnowing chamber below the sieve, and an adaptive conveying belt positioned below the winnowing chamber and having the speed changed according to the load; a slow revolving knife and a fast revolving knife with the same revolving direction are adjacently arranged in the smashing bin, and the slow revolving knife is arranged below the feeding port; a fan is arranged on the left of the winnowing chamber; the running direction of the adaptive conveying belt is opposite to the wind direction;

the wet type water sorting device includes a pool, a feeding port in the right front of the pool, a support above the pool, a division plate fixedly arranged on the support, a smashing knife, a hooking device, a water inlet pipe at the left end of the pool, an overflow port in the middle of the wall of the right rear end of the pool, a circulating water pump connected with the overflow port, a filter screen at the position where the overflow port is connected with the circulating water pump, a discharge port at the middle lower part of the wall of the pool, a deflector plate arranged at the bottom of the pool and forming an acute angle with the bottom surface of the pool, and a residue discharge helix connected with the lower end of the deflector plate; the upper end of the division plate is fixed on the support, and the lower end of the division plate is connected with the bottom of the pool to divide the middle part of the pool; the front end of the hooking device stretches into the water, and the rear end of the hooking device stretches out of the pool and is higher than the front end; the circulating water pump is communicated with the pool via a circulating water pipe, and the deflector plate is arranged below the smashing knife;

the feeding port in the right front of the pool of the wet type water sorting device is arranged below the adaptive conveying belt of the dry type smashing and winnowing device, and the waste which cannot be blown is conveyed to the left by the adaptive conveying belt and falls into the pool via the feeding port.

The central axes of the slow revolving knife and the fast revolving knife which are arranged in the smashing bin are arranged on a movable guide rail, and a spring protection device and an emergency brake switch are arranged on each of the left of the central axis of the slow revolving knife and the right of the central axis of the fast revolving knife.

The distance between the slow revolving knife and the fast revolving knife is set according to the smashing requirement of the waste.

The revolving speed of the fast revolving knife is 5-10 times of that of the slow revolving knife.

The left wall and the right wall of the smashing bin are rotatable walls with a certain weight and are vertical under normal conditions, and an emergency brake switch is arranged on each of the left wall and the right wall of the smashing bin.

The sieve is formed by wire ropes and a rectangular base structure, the wire ropes are all arranged in parallel on the rectangular base structure, one end of each wire rope is fixed on the rectangular base structure, a heavy object is hung at the other end of each wire rope which goes through a slide fastener, and an emergency brake switch is arranged above each heavy object.

The distance between adjacent wire ropes is 50-80 mm.

The vertical distance between the sieve and the slow revolving knife or the fast revolving knife is 30-50 mm.

A protective cover is arranged outside the smashing knife on the support in the wet type water sorting device.

The length of hooks on the hooking device is 80-120 mm, the hooks stretch into the liquid level for 20-30 mm, and the distance between adjacent hooks is 30-50 mm.

The deflector plate is arranged below the smashing knife, and forms an acute angle with the bottom surface, to block inorganic matters sunken to the water bottom from flowing along with water flow.

The hooking device is preferably made of plastic, and can avoid corrosion and rusting.

The present invention has the following beneficial effects:

the system composed of the dry type smashing and winnowing device and the wet type water sorting device is compact in structure; smashing knives with different revolving speeds and the same revolving direction are provided to solve the problems that the smashing knives are prone to be twisted or blocked and the like when smashing the waste, thereby enabling continuous processing of the system which is high in processing efficiency and simple in operation; meanwhile, multiple protection devices are provided, so that the whole system is safe and reliable; perishable organic matters, light combustible matters and inorganic matters can be separated completely; the light combustible matters are picked out by the dry type smashing and winnowing device, which ensures their low water content and facilitates their subsequent energy-oriented utilization. Therefore, the municipal solid waste is turned into valuable thing for it can be utilized sufficiently as a resource, and the system has very high environmental benefits and social benefits.

Figure 1:
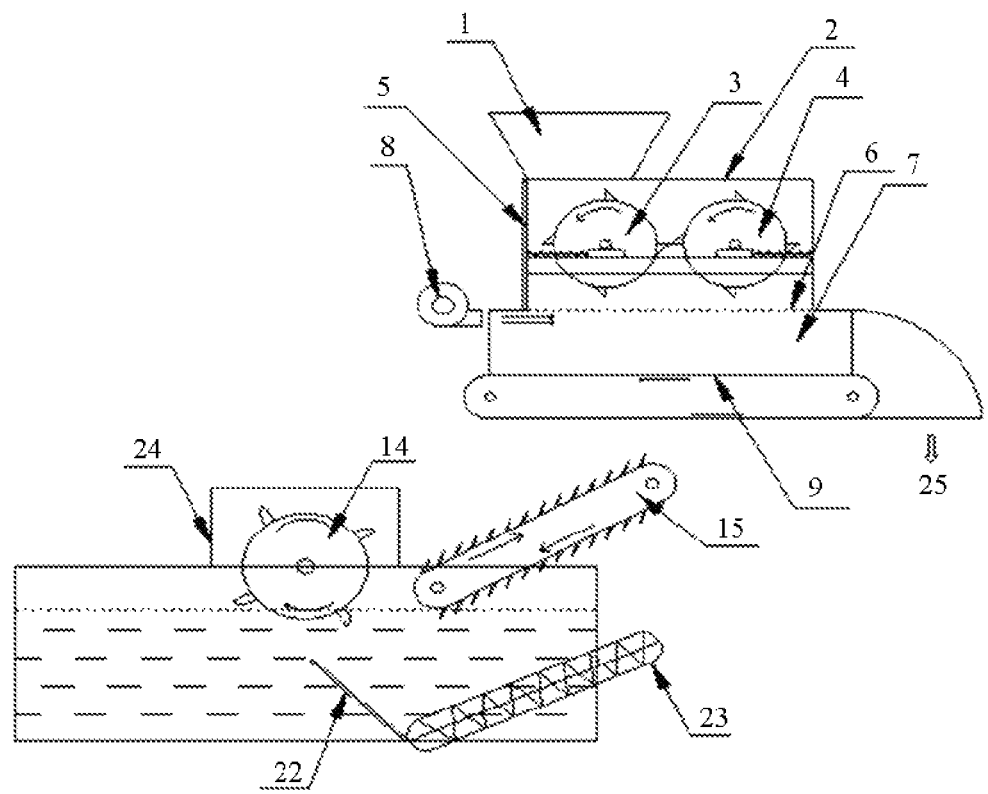
FIG. 1 is a structural schematic diagram of a dry-wet combined sorting system of the present invention.

reference numerals: 1, feeding port; 2 smashing bin; 3 slow revolving knife; 4 fast revolving knife; 5, rotatable wall; 6, sieve; 7, winnowing chamber; 8, fan; 9, adaptive conveying belt; 10, pool; 11, feeding port; 12, support; 13, division plate; 14, smashing knife; 15, hooking device; 16, water inlet pipe; 17, overflow port; 18, filter screen; 19, circulating water pump; 20, circulating water pipe; 21, discharge port; 22, deflector plate; 23, residue discharge helix; 24, protective cover: 25, light combustible matter; 31, movable guide rail; 32, emergency brake switch; 33, spring protection device; 51, emergency brake switch: 61, wire rope; 62, heavy object; 63, slide fastener; 64, emergency brake switch; 65, rectangular base structure.

DETAILED DESCRIPTION OF THE EMBODIMENTS

The present invention will be further described below, but not be limited thereto.

A dry-wet combined sorting system for municipal solid waste includes as dry type smashing and winnowing device and a wet type water sorting device. As shown in FIG. 1, the dry type smashing and winnowing device includes a feeding port 1 at the top thereof, a smashing bin 2 below the feeding port 1, a sieve 6 below the smashing bin 2, a winnowing chamber 7 below the sieve 6, and an adaptive conveying belt 9 positioned below the winnowing chamber 7 and having the speed changed according to the load; a slow revolving knife 3 and a fast revolving knife 4 with the same revolving direction are adjacently arranged in the smashing bin 2, and the slow revolving knife 3 is arranged below the feeding port 1; a fan 8 is arranged on the left of the winnowing chamber 7; and the running direction of the adaptive conveying belt 9 is opposite to the wind direction.

Figure 2:
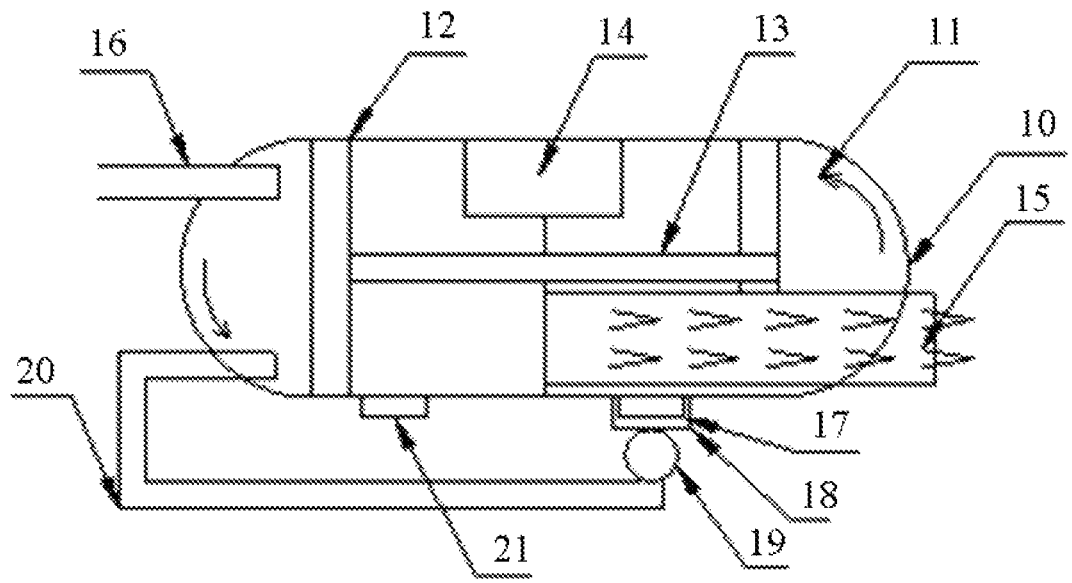
FIG. 2 is a top view of a wet type water sorting device of the present invention.
Figure 3:
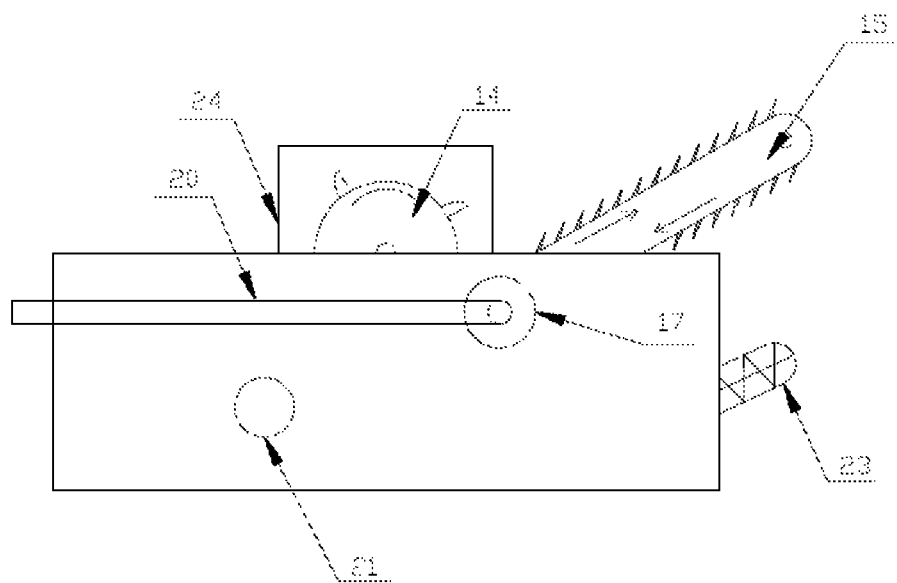
FIG. 3 is a front view of the wet type water sorting device of the present invention.

As shown in FIG. 2 and FIG. 3, the wet type water sorting device includes a pool 10, a feeding port 11 in the right front of the pool 10, a support 12 above the pool 10, a division plate 13 fixedly arranged on the support 12, a smashing knife 14, a hooking device 15, a water inlet pipe 16 at the left end of the pool 10, an overflow port 17 in the middle of the wall of the right rear end of the pool 10, a circulating water pump 19 connected with the overflow port 17, a filter screen 18 at the position where the overflow port 17 is connected with the circulating water pump 19, a discharge port 21 at the middle lower part of the wall of the pool 10, a deflector plate 22 arranged at the bottom of the pool 10 and forming an acute angle with the bottom surface of the pool 10, and a residue discharge helix 23 connected with the lower end of the deflector plate 22; the upper end of the division plate 13 is fixed on the support 12, and the lower end of the division plate 13 is connected with the bottom of the pool 10 to divide the middle part of the pool 10; the front end of the hooking device 15 stretches into the water, and the rear end of the hooking device 15 stretches out of the pool 10 and is higher than the front end; the circulating water pump 19 is communicated with the pool 10 via a circulating water pipe 20, and the deflector plate 22 is arranged below the smashing knife 14.

The feeding port 11 in the right front of the pool 10 of the wet type water sorting device is arranged below the adaptive conveying belt 9 of the dry type smashing and winnowing device, and the waste which cannot be blown is conveyed to the left by the adaptive conveying belt 9 and falls into the pool 10 via the feeding port 11.

The central axes of the slow revolving knife 3 and the fast revolving knife 4 which are arranged in the smashing bin 2 are arranged on a movable guide rail 31, and a spring protection device 33 and an emergency brake switch 32 are arranged on each of the left of the central axis of the slow revolving knife 3 and the right of the central axis of the fast revolving knife 4.

Figure 4:
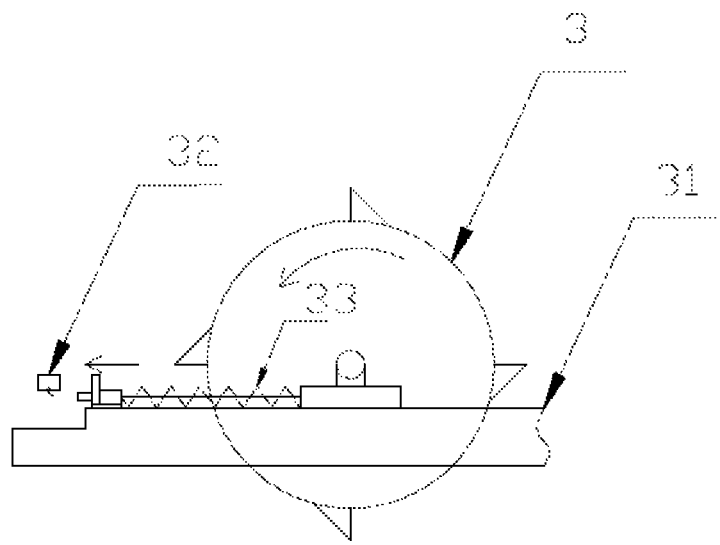
FIG. 4 is a structural schematic diagram of a spring protection device of a dry type smashing and winnowing device of the present invention.

The spring protection device is set as shown in FIG. 4, and is arranged on each of the left of the central axis of the slow revolving hide 3 and the right of the central axis of the fast revolving knife 4; after blades are blocked by the waste which is difficult to smash, the two smashing knives may move along the movable guide rail 31; and after the two smashing knives touch the emergency brake switches 32, the system is stopped to protect the blades.

The distance between the slow revolving knife 3 and the fast revolving knife 4 is set according to the smashing requirement of the waste.

The revolving speed of the fast revolving knife 4 is 5-10 times of that of the slow revolving knife 3.

The vertical distance between the slow revolving hide 3 or the fast revolving hide 4 and the sieve 6 is 30-50 mm.

Figure 5:
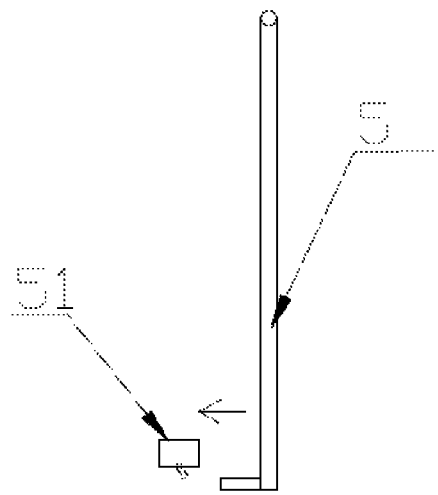
FIG. 5 is a structural schematic diagram of a protection device for a rotatable wall of the dry type smashing and winnowing device of the present invention.

A protection device for a rotatable wall 5 is shown as FIG. 5, the left wall and the right wall of the smashing bin 2 are rotatable walls 5, and an emergency brake switch 51 is arranged on each of the left wall and the right wall of the smashing bin 2. The rotatable walls 5 are vertical under normal conditions; if large objects enter, the rotatable walls 5 are pushed to avoid damaging the blades and touch the emergency brake switches 51 to stop the system.

Figure 6:
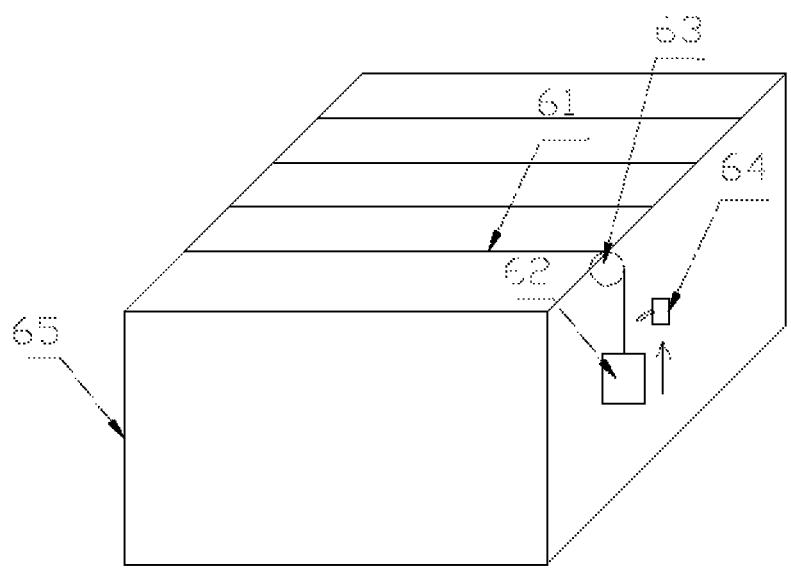
FIG. 6 is a structural schematic diagram of a sieve of the dry type smashing and winnowing device of the present invention.

As shown in FIG. 6, the sieve 6 is formed by wire ropes 61 and a rectangular base structure 65, the wire ropes 61 are all arranged in parallel on the rectangular base structure 65, one end of each wire rope 61 is fixed on the rectangular base structure 65, a heavy object 62 is hung at the other end of each wire rope 61 which goes through a slide fastener 63, and an emergency brake switch 64 is arranged above each heavy object 62.

The wire ropes 61 are all arranged in parallel below the smashing bin 2.

The distance between adjacent wire ropes 61 is 50-80 mm.

When large waste is accumulated on the sieve 6, the wire ropes 61 forming the sieve 6 may move down, and the heavy objects 62 are lifted; and when the heavy objects 62 touch the emergency brake switches 64, the system is stopped.

The weight of the heavy objects 62 can be selected according to practical conditions; and according to the practical condition of waste in Guangzhou, each heavy object 62 is about 100 kg.

A protective cover 24 is arranged outside the smashing knife 14 on the support 12 in the wet type water sorting device.

The length of hooks on the hooking device 15 is 80-120 mm, the hooks stretch into the liquid level for 20-30 mm, and the distance between adjacent hooks is 30-50 mm.

The deflector plate 22 is an arranged below the smashing knife 14, and forms an acute angle with the bottom surface of the pool 10, to block inorganic matters sunken to the water bottom from flowing along with water flow.

The hooking device 15 is preferably made of plastic, and can avoid corrosion and rusting.

The specific working process is as follows:

The system is stalled, waste is fed into the smashing bin 2 from the feeding port 1 at the top of the dry type smashing and winnowing device and driven by the slow revolving knife 3 to revolve, the waste revolving to one side of the fast revolving knife 4 is smashed, and the smashed waste falls onto the sieve 6 below the smashing bin 2; if the size of the waste falling onto the sieve to is smaller than the clearance between the adjacent wire ropes of the sieve 6, the waste falls into the winnowing chamber 7, and if the size is greater than the clearance between the adjacent wire ropes of the sieve 6, the waste retains on the sieve 6 and is smashed by the revolving blades of the slow revolving knife 3 and the fast revolving knife 4 again, till the size of the waste is smaller than the clearance between the adjacent wire ropes of the sieve 6 and the waste falls into the winnowing chamber 7; light combustible matters 25 in the waste entering the winnowing chamber 7 are blown to the right collection port by the fan 8, and the waste which cannot be blown is conveyed to the left by the adaptive conveying belt 9 and falls into the pool 10 via the feeding port 11 in the right front of the pool 10 of the wet type water sorting device; because the division plate 13 divides the middle part of the pool 10, water in the pool 10 swirls anticlockwise along with revolution of the smashing knife 14; the waste entering from the feeding port 11 is smashed by the smashing knife 14 again, the smashed waste flows to the hooking device 15 along with the water flow, and remaining plastic and paper are hooked by the hooking device 15; heavy inorganic matters sunken to the bottom of the pool 10 are gathered at the bottom of the deflector plate 22 under the action of the deflector plate 22, and are discharged by the residue discharge helix 23; a few suspended matters in the middle upper layer of the water flow out via the overflow port 17, are filtered by the filter screen 18, then enter the circulating water pipe 20 via the circulating water pump 19 and newly enter the pool 10; other suspended matters such as kitchen residue in the middle lower layer of the water are periodically discharged from the discharge port 21, and can be used for composting; and when the amount of water in the pool 10 is insufficient, water is supplemented via the water inlet pipe 16.

The invention claimed is:

1. A dry-wet combined sorting system for municipal solid waste, comprising:
   a dry smashing and winnowing device; and
   a wet water soiling device,
   wherein the dry smashing and winnowing device comprises:
      a feeding port;
      a smashing bin below the feeding port;
      a sieve below the smashing bin;
      a winnowing chamber below the sieve;
      an adaptive conveying belt positioned below the winnowing chamber and wherein the adaptive conveying belt having a speed that changes according to a load of the municipal solid waste; and
      a slow revolving knife and a fast revolving knife with the same revolving direction are adjacently arranged in the smashing bin, and the slow revolving is arranged below the feeding port; a fan is arranged on one side of the winnowing chamber; and the running direction of the adaptive conveying belt is opposite to a wind direction that is blown by the fan,
   wherein the wet water sorting device comprises:
      a pool having water;
      a feeding port positioned at a front end of the pool;
      a support above the pool;
      a division plate fixedly arranged on the support;
      a smashing knife;
      a hooking device;
      a water inlet pipe at an end of the pool opposite the feeding port;
      an overflow port position at a rear end of the pool;
      a circulating water pump connected with the overflow port;
      a filter screen positioned where the overflow port is connected with the circulating water pump;
      a discharge port at the middle tower part of the wall of the pool;
      a deflector plate arranged at the bottom of the pool and forming an acute angle with the bottom surface of the pool; and
      a residue discharge helix connected with the lower end of the deflector plate,
   wherein the upper end of the division plate is fixed on the support, and the lower end of the division plate is connected with the bottom of the pool; the front end of the hooking device stretches into the water, and the rear end of the hooking device stretches out of the pool and is higher than the front end of the pool; the circulating water pump is communicated with the pool via a circulating water pipe, and the deflector plate is arranged below the smashing knife, and
   wherein the feeding port positioned at the front end of the pool of the wet water sorting device is arranged below the adaptive conveying belt of the dry smashing and winnowing device, and the waste which cannot be blown is conveyed by the adaptive conveying belt and falls into the pool via the feeding port.

2. The dry-wet combined sorting system for municipal solid waste. of claim 1, wherein the central axes of the slow revolving knife and the fast revolving knife in the smashing bin are arranged on a movable guide rail, and a spring protection device and an emergency brake switch are arranged on each of one side of the central axis of the slow revolving knife and another side of the central axis of the fast revolving knife.

3. The dry-wet combined sorting system for municipal solid waste of claim 2, wherein the revolving speed of the fast revolving knife is 5-10 times of that of the slow revolving knife.

4. The dry-wet combined sorting system for municipal solid waste of claim 2, wherein, the smashing bin includes a left wall and a right wall, the left wall and the right wall of the smashing bin are rotatable walls, and an emergency brake switch is arranged on each of the left wall and the right wall of the smashing bin.

5. The dry-wet combined sorting system for municipal solid waste of claim 2, wherein the sieve is formed by wire, ropes and a rectangular base structure, the wire ropes are all arranged in parallel on the rectangular base structure, one end of each wire rope is fixed on the rectangular base structure, a heavy object is hung at the other end of each wire rope which goes through a slide fastener, and an emergency brake switch is arranged above each heavy object.

6. The dry-wet combined sorting system for municipal solid waste of claim 5, wherein the distance between adjacent wire ropes is 50-80 mm.

7. The dry-wet combined sorting system for municipal solid waste of claim 1, wherein the revolving speed of the fast revolving knife is 5-10 times of that of the slow revolving knife.

8. The dry-wet combined sorting system for municipal solid waste of claim 1, wherein, the smashing bin includes a left wall and a right wall, the left wall and the right wall of the smashing bin are rotatable walls, and an emergency brake switch is arranged on each of the left wall and the right wall of the smashing bin.

9. The dry-wet combined sorting system for municipal solid waste of claim 1, wherein the sieve is formed by wire ropes and a rectangular base structure, the wire ropes are all arranged in parallel on the rectangular base structure, one end of each wire rope is fixed on the rectangular base structure, a heavy object is hung at the other end of each wire rope which goes through a slide fastener, and an emergency brake switch is arranged above each heavy object.

10. The dry-wet combined sorting system for municipal solid waste of claim 9, wherein the distance between adjacent wire ropes 50-80 mm.

11. The dry-wet combined sorting system for municipal solid waste of claim 1, wherein a protective cover is arranged outside the smashing knife on the support in the wet water sorting device.

12. The dry-wet combined sorting system for municipal solid waste of claim 1, wherein the hooking device including hooks, the length of the hooks is 80-120 mm, the hooks stretch into the water for 20-30 mm, and the distance between adjacent hooks is 30-50 mm.

13. The dry-wet combined sorting system for municipal solid waste of claim 12, wherein the hooking device is made of plastic.

14. The dry-wet combined sorting system for municipal solid waste of claim 1, wherein the hooking device is made of plastic.

* * * * *